(12) United States Patent
Tuokkola et al.

(10) Patent No.: US 9,631,599 B2
(45) Date of Patent: Apr. 25, 2017

(54) ARRANGEMENT IN WAVE ENERGY RECOVERY SYSTEM

(75) Inventors: Yrjö Tuokkola, Helsinki (FI); Arvo Järvinen, Vantaa (FI)

(73) Assignee: AW-Energy Oy, Vantaa (FI)

( * ) Notice: Subject to any disclaimer, the term of this patent is extended or adjusted under 35 U.S.C. 154(b) by 421 days.

(21) Appl. No.: 14/346,272

(22) PCT Filed: Sep. 21, 2011

(86) PCT No.: PCT/FI2011/050811
§ 371 (c)(1),
(2), (4) Date: Mar. 20, 2014

(87) PCT Pub. No.: WO2013/041756
PCT Pub. Date: Mar. 28, 2013

(65) Prior Publication Data
US 2014/0230426 A1    Aug. 21, 2014

(51) Int. Cl.
*F03B 13/14* (2006.01)
*F03B 13/16* (2006.01)
*F03B 13/18* (2006.01)

(52) U.S. Cl.
CPC ........... *F03B 13/14* (2013.01); *F03B 13/16* (2013.01); *F03B 13/181* (2013.01); *Y02E 10/28* (2013.01); *Y02E 10/38* (2013.01)

(58) Field of Classification Search
CPC .......... F03B 13/12; F03B 13/14; F03B 13/16; F03B 13/18; F03B 13/1805; F03B 13/181; F03B 13/182; F03B 13/1815; F03B 13/26; F03B 13/262; F03B 13/264; Y02E 10/30; Y02E 10/38

USPC ........... 60/495–507, 398; 417/100, 330–337; 290/42, 53
See application file for complete search history.

(56) References Cited

U.S. PATENT DOCUMENTS

| 4,105,368 A | 8/1978 | Waters |
| 4,118,932 A * | 10/1978 | Sivill ............. F03B 13/20 417/332 |
| 4,480,966 A | 11/1984 | Smith |
| 4,490,621 A * | 12/1984 | Watabe ........... F03B 13/182 290/42 |
| 4,781,023 A * | 11/1988 | Gordon ........... F03B 13/20 290/42 |
| 2010/0308590 A1 | 12/2010 | Rohrer |

FOREIGN PATENT DOCUMENTS

FR      379050 A * 10/1907 ........... F03B 13/182
WO  WO 2011/079199 A1    6/2011

* cited by examiner

*Primary Examiner* — Mark A Laurenzi
*Assistant Examiner* — Mickey France
(74) *Attorney, Agent, or Firm* — Birch, Stewart, Kolasch & Birch, LLP (57) ABSTRACT

This invention relates to an arrangement in a wave energy recovery system comprising at least a wing element hinged on its one edge to make a reciprocating motion in response to kinetic energy of waves or tidal currents, a wave energy recovery means having a space alterable by its volume with the help of a connection rod making a reciprocating movement caused by the wing element At least the sealings and/or through holes between the space and the connection rod are protected against seawater.

9 Claims, 5 Drawing Sheets

ARRANGEMENT IN WAVE ENERGY RECOVERY SYSTEM

The present invention relates to an arrangement in a wave energy recovery system as defined in the preamble of claim 1.

The arrangement in the wave energy recovery system according to the invention is suited very well for instance to be used in connection with an apparatus having a plate like wing hinged with its one edge to make a reciprocating movement caused by wave energy or tidal energy of seawater, and a cylinder with a piston making the reciprocating movement actuated by the wing. The wave energy or tidal energy collected by the apparatus is further converted with a wave energy converter system for instance to electric energy and/or fresh water.

According to the prior art there are various types of wave energy recovery systems where the arrangements include a base and one or more wings pivotally connected to the base to make a reciprocating or oscillating movement about a rotation axis in response to wave forces or tidal forces. The oscillating movement is then conducted to a piston that makes a reciprocating movement in a cylinder, and is further converted for example to electric energy with the help of a generator or alike.

In prior art various wave energy recovery systems are known where the mechanical kinetic energy of waves are converted by the help of a piston making a reciprocating movement in a cylinder into other forms of useful energy. For instance WO2004007953A1 shows a desalination system where a plate type wave-energy absorbing panel moves back and forth a connection rod that further uses a pump.

Also WO2006100436A1 shows a wave energy recovery system where the mechanical kinetic energy of waves are converted by the help of a piston making a reciprocating movement in a cylinder into other forms of useful energy. For example FIGS. 6a and 6b show reciprocating flap portion whose reciprocating movement is converted into other form of energy by the help of driving rod moving back and forth in a pivotally installed hydraulic cylinder where the driving rod moves a piston back and forth. When the flap portion oscillates in response to wave actions the driving rod is driven to cause hydraulic fluid in the cylinder to be pressurized by the action of the piston, and the pressurized fluid then flows out and returns via pipe work connections into the hydraulic circuit of the power take off system.

As a problem with these two systems mentioned above and with other similar systems where the hydraulic cylinders with their piston rods are in a direct contact with seawater is a harsh neighbourhood where especially piston rods with their bushings and sealings are subjected to extreme environmental conditions, among other things to corrosive effects and sea plants. In addition the bushings may leak hydraulic oil to seawater causing environmental problems, or seawater may soak through the bushings to the cylinders damaging the components. These problems shorten the lifetime of hydraulic cylinders and cause service breaks more often, which reduces the capacity of the wave energy recovery installations and causes additional costs.

The object of the present invention is to eliminate the drawbacks described above and to achieve a reliable and efficient arrangement in a wave energy recovery system that is capable of capturing a maximum amount of available wave or tidal energy and converting it efficiently to electric energy or to another suitable energy without a need to be serviced too often due to a failure caused by a hostile seawater neighbourhood. Likewise the object of the present invention is to achieve an arrangement in a wave energy recovery system that is environmentally friendly and does not leak for instance hydraulic oil through worn out or damaged bushings to seawater. The arrangement in the wave energy recovery system according to the invention is characterized by what is presented in the characterization part of claim 1. Other embodiments of the invention are characterized by what is presented in the other claims.

The solution of the invention has the advantage that thanks to the decent protection of the hydraulic cylinders and piston rods with their bushings and sealings against seawater and its wearing conditions the lifetime of the hydraulic cylinders and their components increases, which means further longer maintenance intervals and lower operation costs. Also cost savings are achieved in materials because changing intervals become longer. In addition the reliability of the installation becomes better and the continuous energy production without disturbing interruptions is achieved. That means also improved productivity and competitiveness. Yet a further important advantage is the improved friendliness to the environment.

In the following, the invention will be described in detail by the aid of examples by referring to the attached simplified and diagrammatic drawings, wherein.

Figure 1:
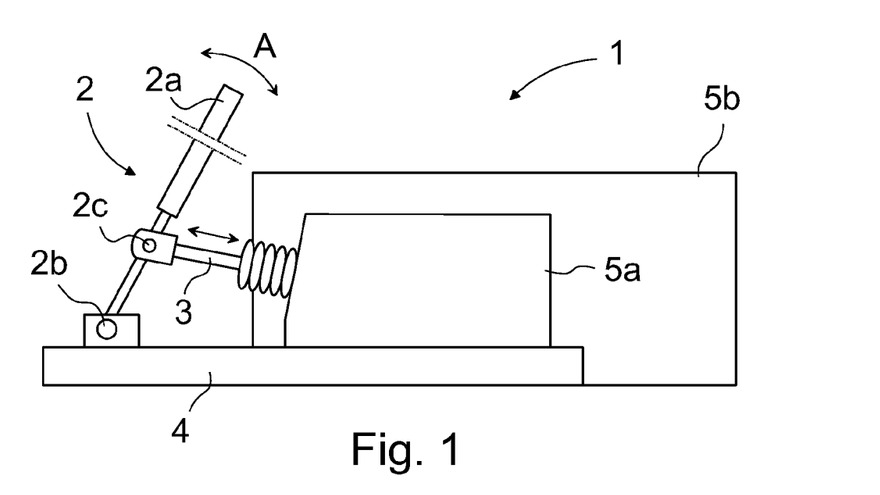
FIG. 1 presents in a simplified side view a module of a wave energy recovery system according to the invention.
Figure 2:
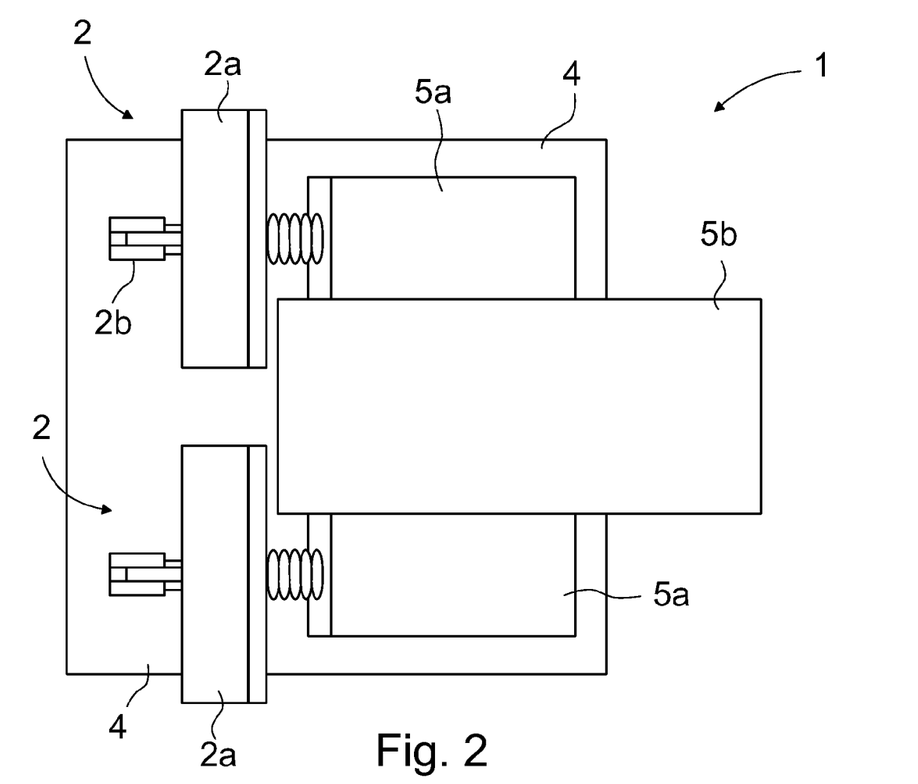
FIG. 2 presents in a simplified top view the wave energy recovery module according to FIG. 1.

In FIGS. 1 and 2 a wave energy recovery module 1 according to the invention is shown in a simplified way. The wave energy recovery module 1 can be used for recovering kinetic energy like wave energy or tidal energy of seawater, and for converting it for example to electric energy or for desalination of seawater to make fresh water. The wave energy recovery module 1 according to the embodiment has for example been anchored in its production site onto the sea bottom and is situated for example in a so-called intermediate water area of the water basin, but can also be in other areas of the water basin.

The wave energy recovery module 1 comprises at least a body 4 that functions as a base, one or more onto the body 4 attached recovery units 2 for recovering wave energy, collecting means in closed and waterproof protective housings 5a and 5b for collecting the energy recovered by the recovery units 2, and a cable 5c for transferring the collected energy to further use. The protective housings 5a and 5b are dry spaces containing mainly air or another suitable gas, and all the through holes and bushings are sealed against seawater. If, for instance, one of the housings 5a or 5b leaks in seawater the leaked seawater cannot leak further into another housing 5a or 5b through the through holes or bushings between the housings.

The body 4 is made for instance of concrete or steel and consists of a group of floating compartments, instrument and machinery chambers that are kept dry, and valve compartments at both ends of the body 4. In the valve compartments there are filling and discharge valves for air and filling and discharge valves for water. Water pipes and air pipes has been installed to go through the separation walls of the compartments in order to allow water and air to run into all the floating compartments and valve compartments. Thanks to its heavy concrete or steel structure the wave energy recovery module 1 remains steady on the sea bottom when the floating compartments are filled with water. Correspondingly floating compartments are big enough to allow the body 4 to float on the surface of the water when the floating compartments are filled with air.

Each recovery unit 2 comprises at least a plate like wing element 2a that is hinged onto the body 4 of the wave energy recovery module 1 by a rotation axis 2b at its lower edge, and recovering means or power-take-of (PTO) means of the wave energy powered by a connection rod 3 connected to a pivot point 2c of the wing element 2a to make oscillating movement with the wing element 2a. The wing element 2a is arranged to make reciprocating motion caused by the kinetic energy of the waves, and the recovered energy is either saved into the energy storages situated in the body 4 or transferred through the collecting means and cable 5c to the use of the next unit that can be for instance a collecting station situated on a shore. The fresh water produced by the wave energy recovery module 1 can be stored in containers situated in the body 4 of the wave energy recovery module 1, and delivered time to time for further use.

The plate like wing element 2a has been hinged at its lower edge onto the body 4 of the base to make a reciprocation motion about its rotation axis 2b in response to kinetic energy of waves. The motion is shown with an arrow A. The plate like wing 2a may be totally under the sea level or it can also reach from the body 4 to the surface of the water. It can be mentioned that the wing element 2a may be hinged alternatively at its side edge or top edge.

Figure 3:
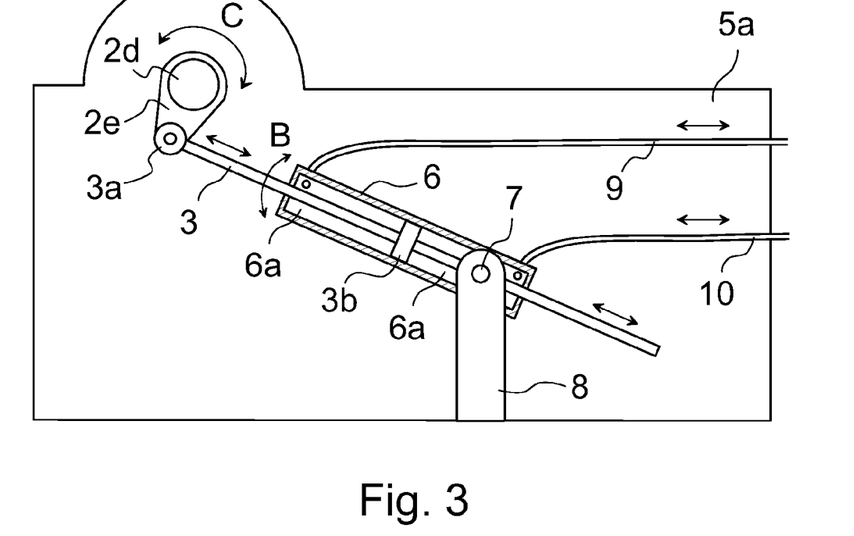
FIG. 3 presents in a cross section and in a simplified and diagrammatic way a protective arrangement of the wave energy recovery system according to the invention.

In FIG. 3 one protective arrangement of the wave energy recovery system according to the invention is shown in a cross section and in a simplified and diagrammatic way. The essential idea is to protect the hydraulic cylinders 6 and piston rods 3 with their through holes, bushings and sealings against seawater and its wearing conditions. A free end of the torsion shaft 2d connected to the wing element 2a has been placed in the protective housing 5a and the through hole of the torsion shaft 2d has been tightly sealed against seawater. The free end of the torsion shaft 2d has been equipped with a crank arm 2e that follows the oscillating movement C of the torsion shaft 2d actuated by the wing element 2a.

The hydraulic cylinder 6 acting as a wave energy recovery means is placed inside the protective housing 5a and hinged at its location by a hinge 7 supported by a support arm 8 so that the hydraulic cylinder 6 can pivot up and down about the hinge 7 as shown by the arrow B. A piston 3b fastened to the connection rod 3 has been placed a space 6a inside the hydraulic cylinder 6 so that in a neutral position the piston 3b is in the middle of the hydraulic cylinder 6. The volume of the space 6a between each side of the piston 3b is alterable by the movement of the piston 3b when the piston 3b makes a reciprocating movement with the connection rod (3). In that way the piston 3b is arranged to pump and suck in both directions.

The first end of the connection rod 3 is connected to the free end of the crank arm 2e with a sleeve bearing 3a, and the second end of the connection rod 3 is passed through the second end plate of the hydraulic cylinder 6, the second end of the connection rod 3 being at least so long that the piston 3b can move inside the hydraulic cylinder 6 from the first end of the cylinder to the second end of the cylinder so that the second end of the connection rod 3 keeps out of the cylinder 6 all the time. The through holes between the both ends of the cylinder 6 and the connection rod 3 has been sealed in the normal way. When the piston 3 is in its neutral position in the middle of the hydraulic cylinder 6 the hydraulic fluid volumes in the cylinder 6 at each side of the piston 3b are substantially equal thanks to the connection rod 3 at the both sides of the piston 3b. When the waves oscillate the wing element 2a and its torsion shaft 2d the crank arm 2e causes the connection rod 3 to make a reciprocating movement and further the piston 3b to make a reciprocating linear movement in the hydraulic cylinder 6.

Hydraulic pipes 9 and 10 are connected to the hydraulic cylinder 6 so that the first pipe 9 is connected to the first end of the hydraulic cylinder 6 and the second pipe 10 is connected to the second end of the hydraulic cylinder 6 at the other side of the piston 3b than the first pipe 9. The through holes at the wall of the protective housing 5a for the hydraulic pipes 9 and 10 have a waterproof sealing against seawater.

Figure 4:
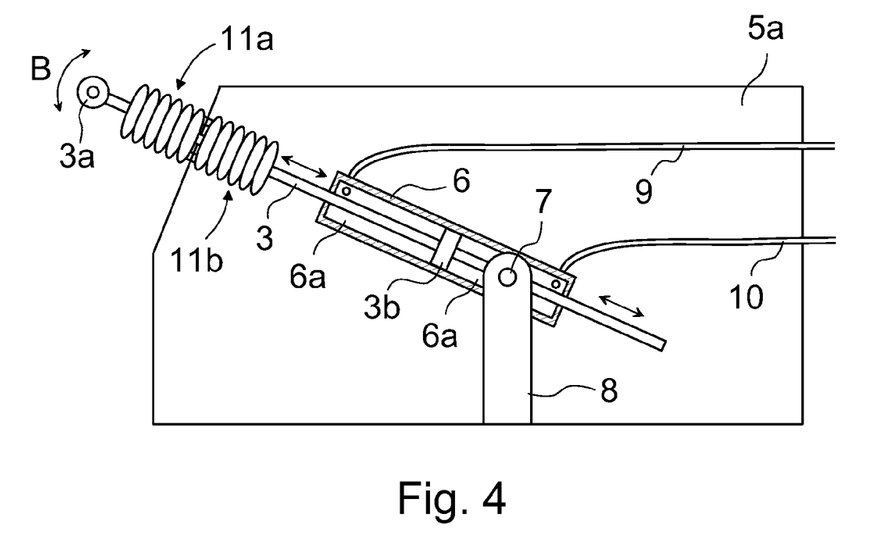
FIG. 4 presents in a cross section and in a simplified and diagrammatic way another protective arrangement of the wave energy recovery system according to the invention.

In FIG. 4 another advantageous protective arrangement of the wave energy recovery system according to the invention is shown in a cross section and in a simplified and diagrammatic way. In this embodiment the arrangements concerning the hydraulic cylinder 6, piston 3b, connection rod 3 and the hydraulic pipes 9 and 10 are essentially the same as in the previous embodiment but the sealing of the protective housing 5a against seawater differs from the previous embodiment. In this case the sealing is implemented with special flexible bellows units 11a and 11b filled with a suitable fluid, such as water or hydraulic oil or other suitable fluid. In this case the connection rod 3 is not completely inside the protective housing 5a but protrudes out from the wall of the protective housing 5a. The outer bellows unit 11a is fastened with its first end water tightly to the connection rod 3 for example by welding or by other suitable fastening means, and with its second end also water tightly to the outer wall of the protective housing 5a, which wall has a through hole for the connection rod 3 to go through the wall to inside the protective housing 5a. Inside the protective housing 5a the inner bellows unit 11b is fastened with its first end water tightly to the inner wall of the protective housing 5a and with its second end water tightly to the connection rod 3 for example by welding or by other suitable fastening means.

The fastening of the bellows units 11a and 11b to the connection rod 3 is such that the first end of the outer bellows unit 11a and the second end of the inner bellows unit 11b move synchronously together with the reciprocating movement of the connection rod 3. Thus, when the connection rod 3 moves inwards the outer bellows unit 11a is squeezed and correspondingly the inner bellows unit 11b is enlarged. And when the connection rod 3 moves outwards the inner bellows unit 11b is squeezed and correspondingly the outer bellows unit 11a is enlarged. The diameter of the through hole for the connection rod 3 in the wall of the protective housing 5a can be bigger than the diameter of the connection rod 3, and in that way the connection rod 3 and the hydraulic cylinder 6 can pivot up and down about the hinge 7 with the movement of the wing element 2a as shown by the arrow B.

Figure 5:
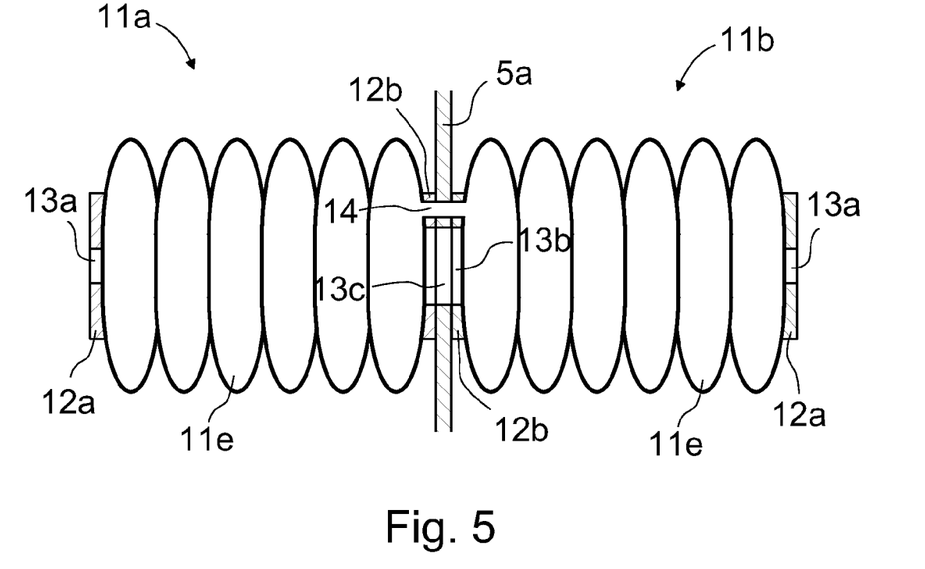
FIG. 5 presents in a cross section, enlarged and in a simplified and diagrammatic way a detail of the protective arrangement of the wave energy recovery system according to the invention in the first position.
Figure 6:
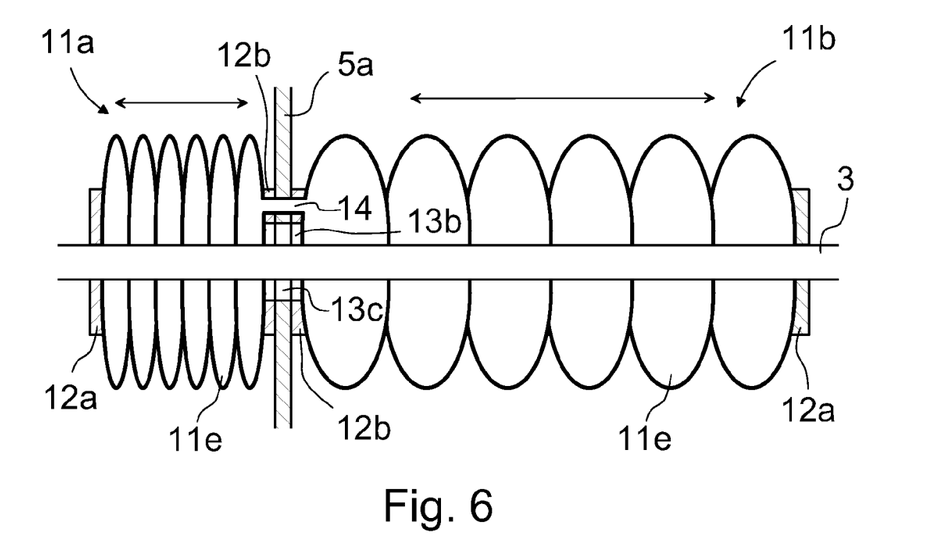
FIG. 6 presents in a cross section, enlarged and in a simplified and diagrammatic way a detail of the protective arrangement of the wave energy recovery system according to the invention in second position.

In FIGS. 5 and 6 a detail of the protective arrangement of the wave energy recovery system according to the invention is shown in a cross section, enlarged and in a simplified and diagrammatic way in case where bellows units 11a and 11b are used for the sealing of the through hole of the connection rod 3. In FIG. 5 a neutral situation is shown and in FIG. 6 the situation where the connection rod 3 has been moved inwards to the protective housing 5a. In FIG. 5 the connection rod 3 is not shown for the sake of clarity but in FIG. 6 the connection rod 3 is shown going through the bellows units 11a and 11b. The bellows units 11a and 11b are basically similar. They both are mainly made of rubber or other suitable flexible material and they consist of several parallel hollow compartments 11e that are connected to each other. The compartments 11e have no separating wall between each other and the center area of each compartment 11e is open towards the adjacent compartment 11e. So the interior of the bellows unit 11a, 11b is hollow and uniform having the same pressure in all the compartments 11e of the same bellows unit 11a or 11b.

At the first end of each bellows unit 11a and 11b there is a first connection plate 12a and at the second end of each bellows unit 11a and 11b there is a second connection plate 12b. The connection plates 12a and 12b are tightly secured to the bellows units 11a and 11b and are made of metal such as steel or of other suitable material. The first connection plate 12a has a center bore 13a whose diameter is only somewhat bigger than the diameter of the connection rod 3. Correspondingly the second connection plate 12b has a center bore 13b whose diameter is preferably much bigger than the diameter of the connection rod 3 but depending on the structure can also be only somewhat bigger than the diameter of the connection rod 3. In case the center bore 13b is only somewhat bigger than the diameter of the connection rod 3 an additional channel 14 from the first bellows unit 11a to the second bellows unit 11b is needed. The additional channel 14 connects the interiors of the bellows units 11a and 11b for example through the connection plates 12a and 12b and through the front wall of the protective housing 5a. The task of the additional channel 14 is to equalize the pressure in both the bellows units 11a and 11b.

Figure 7:
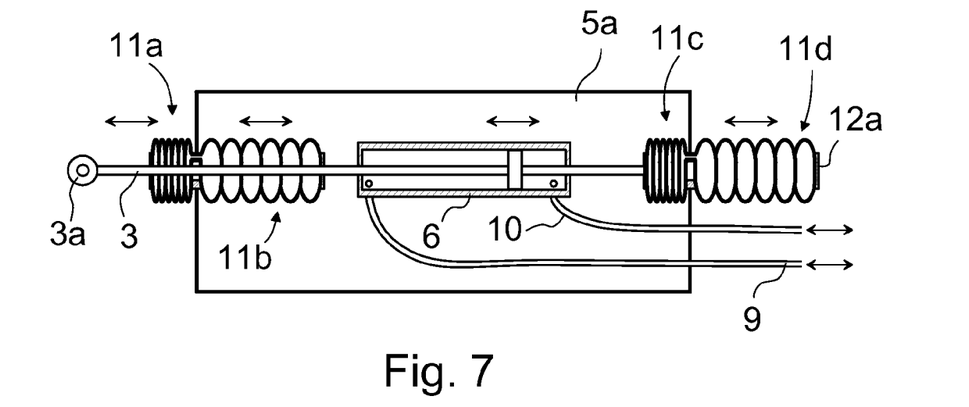
FIG. 7 presents in a cross section and in a simplified and diagrammatic way yet another protective arrangement of the wave energy recovery system according to the invention.

In FIG. 7 yet another protective arrangement of the wave energy recovery system according to the invention is shown in a cross section and in a simplified and diagrammatic way. The arrangement shown in FIG. 7 is otherwise essentially the same as shown in FIG. 4 but the second end of the connection rod 3 has been connected to another pair of bellows units 11c and 11d where the second end of the inner bellows unit 11c is water tightly secured inside to the back wall of the protective housing 5a and the first end of the outer bellows unit 11d is water tightly secured outside to the back wall of the protective housing 5a, and the interiors of both the bellows units 11c and 11d are connected to each other with a through hole in the back wall of the protective housing 5a similar to the center bore 13b described above. In this case the connection plate 12a at the second end of the outer bellows unit 11d is water tightly closed.

The second end of the connection rod 3 is connected to the first connection plate 12a of the inner bellows unit 11c so that the connection rod 3 squeezes the inner bellows unit 11c when coming inside to the protective housing 5a and enlarges the inner bellows unit 11c when moving outside from the protective housing 5a. When the inner bellows unit 11c squeezes the outer bellows unit 11d enlarges and vice versa. At the same time when the connection rod 3 squeezes or enlarges the bellows units 11c and 11d of the second bellows unit pair it also squeezes or enlarges the bellows units 11a and 11b of the first bellows unit pair at the front end of the protective housing 5a. When the inner bellows unit 11b inside the front end of the protective housing 5a enlarges the inner bellows unit 11c inside the back end of the protective housing 5a simultaneously squeezes so that the volume and pressure inside the protective housing 5a remain unchanged. That is not so important if the protective housing 5a is filled with air or gas because it can be compressed, but if the protective housing 5a is filled with fluid that cannot be compressed the structure with the second pair of bellows units 11c and 11d is essential. It may also happen that the protective housing 5a is planned to be filled with air or gas only but for some reason seawater leaks inside and fills the whole interior. Then the installation equipped with the second pair of bellows units 11c and 11d can be used at least temporarily as long as a service or repair takes place. Also a ball filled with air or some suitable gas can be used inside the protective housing 5a instead of the second pair of bellows units 11c and 11d.

Figure 8:
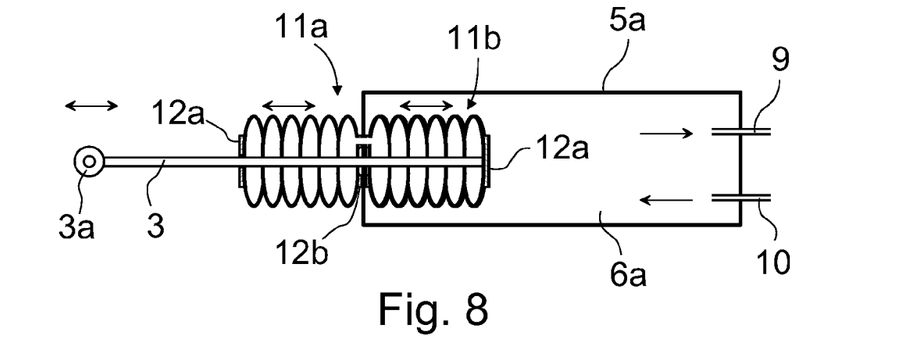
FIG. 8 presents in a cross section and in a simplified and diagrammatic way yet another protective arrangement of the wave energy recovery system according to the invention.

In FIG. 8 yet another protective arrangement of the wave energy recovery system according to the invention is shown in a cross section and in a simplified and diagrammatic way. The connection rod 3 with its through hole and the pair of bellows units 11a and 11b at the front end of the protective housing 5a are otherwise essentially the same as shown in FIG. 4 but now the second end of the connection rod 3 has been water tightly connected to the connection plate 12a at the second end of the bellows unit 11b inside the protective housing 5a. Now the bellows unit 11b inside the protective housing 5a functions as a piston and the protective housing 5a, that can be smaller than the protective housing 5a in the previous embodiments, functions as a hydraulic cylinder. Hydraulic pipes 9 and 10 are connected to the protective housing 5a with waterproof sealings against seawater.

Figure 9:
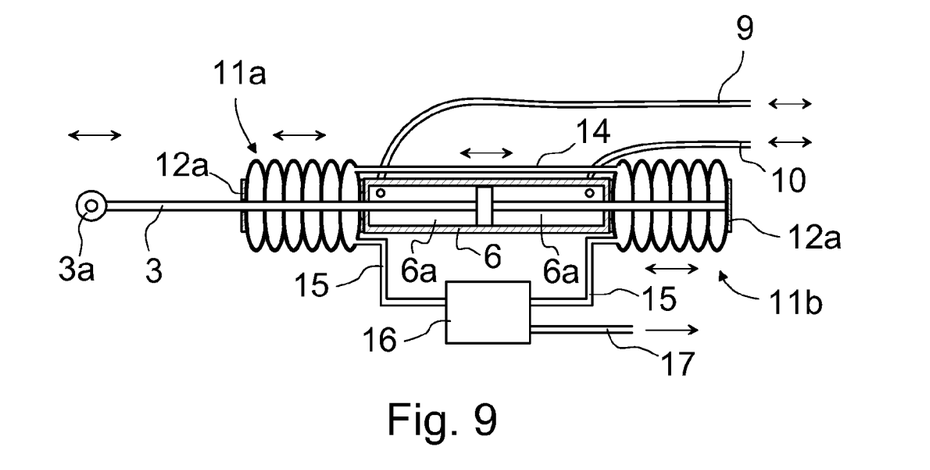
FIG. 9 presents in a cross section and in a simplified and diagrammatic way yet another protective arrangement of the wave energy recovery system according to the invention.

In FIG. 9 yet another protective arrangement of the wave energy recovery system according to the invention is shown in a cross section and in a simplified and diagrammatic way. In this embodiment both the ends of the hydraulic cylinder 6 have been protected against seawater with a bellows unit. The first bellows unit 11a is secured water tightly at the first end of the hydraulic cylinder 6 and the second bellows unit 11b is secured water tightly at the second end of the hydraulic cylinder 6. The connection rod 3 equipped with the piston 3b inside the hydraulic cylinder 6 goes through the first bellows unit 11a to the hydraulic cylinder 6 and further from the hydraulic cylinder 6 through its second end into the second bellows unit 11b, and the second end of the connection rod 3 is water tightly secured to the second end of the second bellows unit 11b.

The additional channel 14 acting as a connection channel is connected between the interiors of the bellows units 11a and 11*b*, and another additional channel 15 is connected from both the bellows units 11*a* and 11*b* into the pressure regulation and control device 16 that is further connected via channel 17 to other operation means of the installation. The pressure regulation and control device 16 is needed to compensate a leak from the hydraulic cylinder 6 into the bellows units 11*a*, 11*b*, or a suction from bellows units 11*a*, 11*b* into the hydraulic cylinder 6. In this embodiment the through holes at the ends of the hydraulic cylinder 6 are protected against seawater with the bellows units 11*a* and 11*b*, and the interiors of the bellows units 11*a* and 11*b* are connected together with their fluid and pressure circuit, and in addition the bellows units 11*a* and 11*b* are connected to the pressure regulation and control device 16 in order to keep the pressure at the wanted level.

Figure 10:
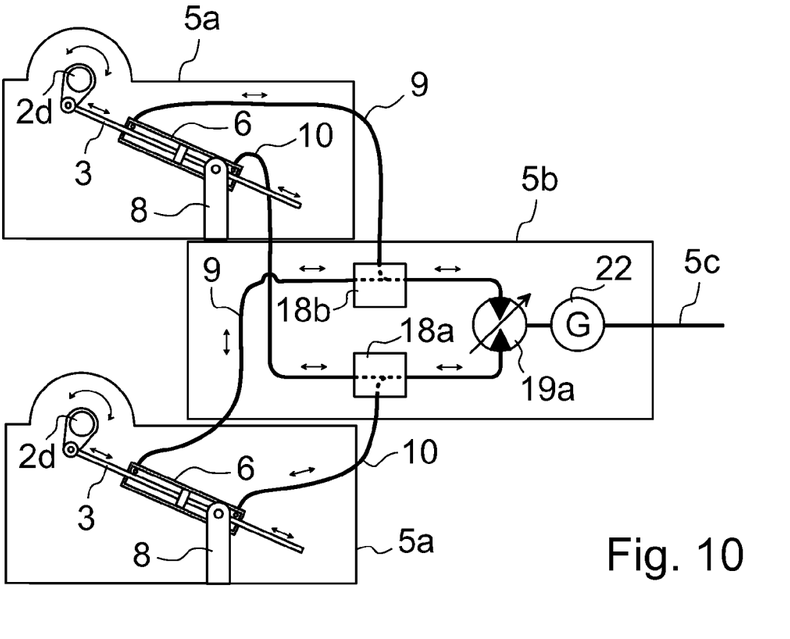
FIG. 10 presents in a simplified and diagrammatic way a part of a hydraulic system of the arrangement of the wave energy recovery system according to the invention.
Figure 11:
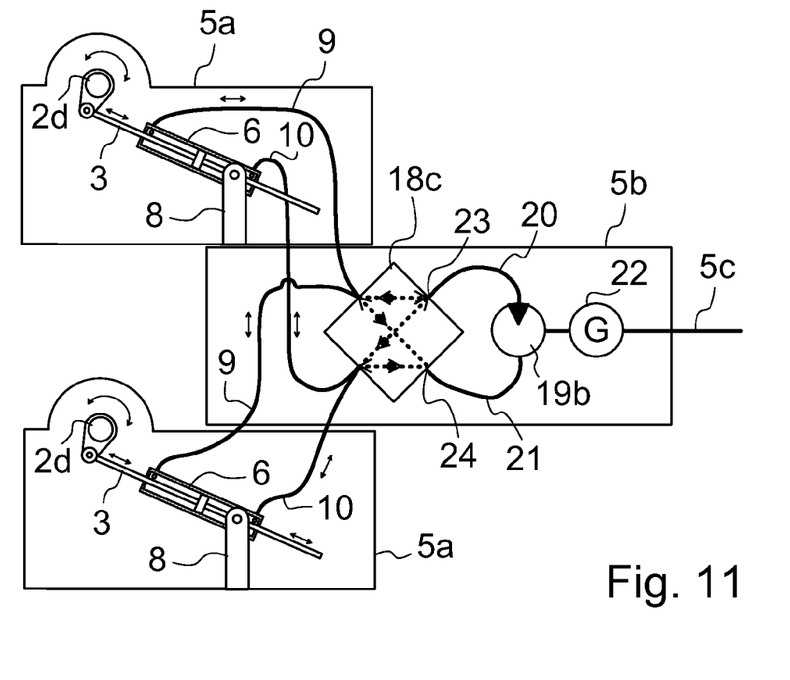
FIG. 11 presents in a simplified and diagrammatic way a part of another hydraulic system of the arrangement of the wave energy recovery system according to the invention.

In FIGS. 10 and 11 the connection of the pressure developing arrangement, for example the hydraulic cylinder 6, into the hydraulic system of the installation is shown in a simplified and diagrammatic way. The hydraulic pipes 9 and 10 from the hydraulic cylinder 6 or from the protective housing 5*a* are connected to the second protective housing 5*b* where a part of the installation machinery is situated in a dry space and in a protection against seawater. All the through holes between the protective housings 5*a* and 5*b* are protected water tightly against seawater.

In FIG. 10 the hydraulic pipe 10 from the back end of the first hydraulic cylinder 6 is connected via a divider means 18*a* to a hydraulic motor 19*a*, and also the hydraulic pipe 10 from the back end of the second hydraulic cylinder 6 is connected via the same divider means 18*a* to the same hydraulic motor 19*a*. Correspondingly the hydraulic pipe 9 from the front end of the first hydraulic cylinder 6 is connected via a divider means 18*b* to the same hydraulic motor 19*a*, and also the hydraulic pipe 9 from the front end of the second hydraulic cylinder 6 is connected via the same divider means 18*b* to the same hydraulic motor 19*a*.

The hydraulic motor 19*a* is a so-called variable displacement motor that rotates over the zero position. This kind of hydraulic motor 19*a* rotates only in one direction though the direction of the oil flow in the hydraulic pipes 9 and 10 changes. The hydraulic motor 19*a* is connected to rotate a generator 22 to produce electricity that is conducted further via the electric cable 5*c*.

In FIG. 11 the hydraulic pipe 10 from the back end of the first hydraulic cylinder 6 and the hydraulic pipe 10 from the back end of the second hydraulic cylinder 6 are connected to the first inlet/outlet port of a hydraulic rectifier 18*c*, and the hydraulic pipe 9 from the front end of the first hydraulic cylinder 6 and the hydraulic pipe 9 from the front end of the second hydraulic cylinder 6 are connected to the second inlet/outlet port of a hydraulic rectifier 18*c*. A hydraulic pipe 20 where the fluid flow is only unidirectional is connected from the outlet port 23 of the hydraulic rectifier 18*c* to the hydraulic motor 19*b* from where another hydraulic pipe 21 is connected to the inlet port 24 of the hydraulic rectifier 18*c* from which the fluid flows back to the hydraulic cylinders 6. Because of the unidirectional fluid flow in the hydraulic pipes 20 and 21 the hydraulic motor 19*b* rotates to the same direction all the time. Also in this case the hydraulic motor 19*b* is connected to rotate a generator 22 to produce electricity that is conducted further via the electric cable 5*c*.

It is common for all the embodiments described above that the sealings of the reciprocating connection rod 3 has been protected against seawater. The connection rod 3 can be completely isolated from seawater or only partially so that only the front end of the connection rod 3 is in seawater. In addition the connection rod 3 can be connected to the wing element 2*a* with an additional shaft that converts the oscillating curvilinear movement of the pivot point 2*c* of the wing element 2*a* to a reciprocating linear movement. In that case the mounting of the hydraulic cylinder 6 is easier.

The bellows units 11*a*-11*d* are filled with a fluid so that the bellows units endure at least the variable pressure of around 1-2 bar prevailing at the depth of the wave energy recovery system installation. The arrangement comprises means to keep the pressure in the bellows units 11*a*-11*d* correct depending on the depth where the installation is situated.

It is obvious to the person skilled in the art that the invention is not restricted to the example described above but that it may be varied within the scope of the claims presented below. Thus, for example, the structure of the wave energy recovery module and its components can vary.

It is also obvious to the person skilled in the art that the pressure medium in the hydraulic cylinder or more commonly in the wave energy recovery means can be also other than hydraulic fluid or oil. It can be also other liquid of even gas, such as air.

The invention claimed is:

1. A wave energy recovery system comprising:
    a wing element hinged on its one edge to make a reciprocating motion in response to kinetic energy of waves or tidal currents;
    a wave energy recovery device;
    a connection rod imparting the reciprocating motion of said wing element to said wave energy recovery device;
    said wave energy recovery device including,
        a protective housing having housing walls, and
        a hydraulic cylinder provided in the protective housing and provided with a piston operably connected to said connection rod for actuation thereby,
        said housing walls of said protective housing protecting said hydraulic cylinder from exposure to seawater;
    said connection rod extending through a first housing wall; and
    a bellows seal surrounding the connection rod as it extends though the first housing wall, the bellows seal sealing the contents of said housing from exposure to said seawater including,
        an outer bellows sealingly and fixedly connected at a first end to said connection rod outside said protective housing and at a second end to said first housing wall, and
        an inner bellows sealingly and fixedly connected at a first end to the connection rod inside said protective housing and at a second end to said first housing.

2. The wave energy recovery system according to claim 1, wherein the hydraulic cylinder of said wave recovery device has a cylinder space of alterable volume defined by the hydraulic cylinder and associated piston, the cylinder space including first and second alterable volumes formed by said cylinder on opposed sides of the piston,
    said connection rod penetrating both of said first and second alterable volumes of the hydraulic cylinder with the piston located intermediate thereto,
    hydraulic seals provided where the connection rod penetrates said hydraulic cylinder at each of aid first and second alterable volumes.

3. An arrangement in a wave energy recovery system according to claim 1 or 2, wherein the protective housing is waterproof and protects the hydraulic seals from exposure to seawater.

4. The wave energy recovery system according to claim 2, wherein the housing includes a second housing wall, the connection rod extending though said hydraulic cylinder intermediate said first and second housing walls and passing through the second housing wall, wherein a second bellows seal seals the contents of said housing from exposure to said seawater as said connection rod passes though said second housing wall, said second bellow seal including,
a second outer bellows sealingly and fixedly connected at a first end to said connection rod outside said protective housing and at a second end to said second housing wall, and
a second inner bellows sealingly and fixedly connected at a first end to the connection rod inside said protective housing and at a second end to said second housing wall.

5. The wave energy recovery system according to claim 1, wherein the protective housing is provided with a connection plate through which the connection rod extends, the connection plate being provided with a through hole through which said connection rod extends, a diameter of the through hole of a connection plate being bigger than the diameter of the connection rod.

6. The wave energy recovery system according to claim 1 wherein the wave recovery system is installed at an installation depth, further comprising means to keep the pressure in the bellows correct depending on the installation depth where the installation is situated.

7. The wave energy recovery system according to claim 1, wherein the bellows are included in a bellows unit, the system further comprising a pressure regulator and control to compensate a leak from the hydraulic cylinder into the bellows units, or suction from bellows units into the hydraulic cylinder.

8. The wave energy recovery system according to claim 1, further comprising the hydraulic cylinder equipped with the outer bellows provided at the end thereof.

9. The wave energy recovery system according to claim 1, wherein at least one connection channel is connected between the interiors of the inner and outer bellows.

* * * * *